Dec. 27, 1955  A. A. MUEHLING  2,728,364
UNIVERSAL MACHINE TOOL HAVING A SWINGABLE BOOM
Filed March 16, 1953  14 Sheets-Sheet 1
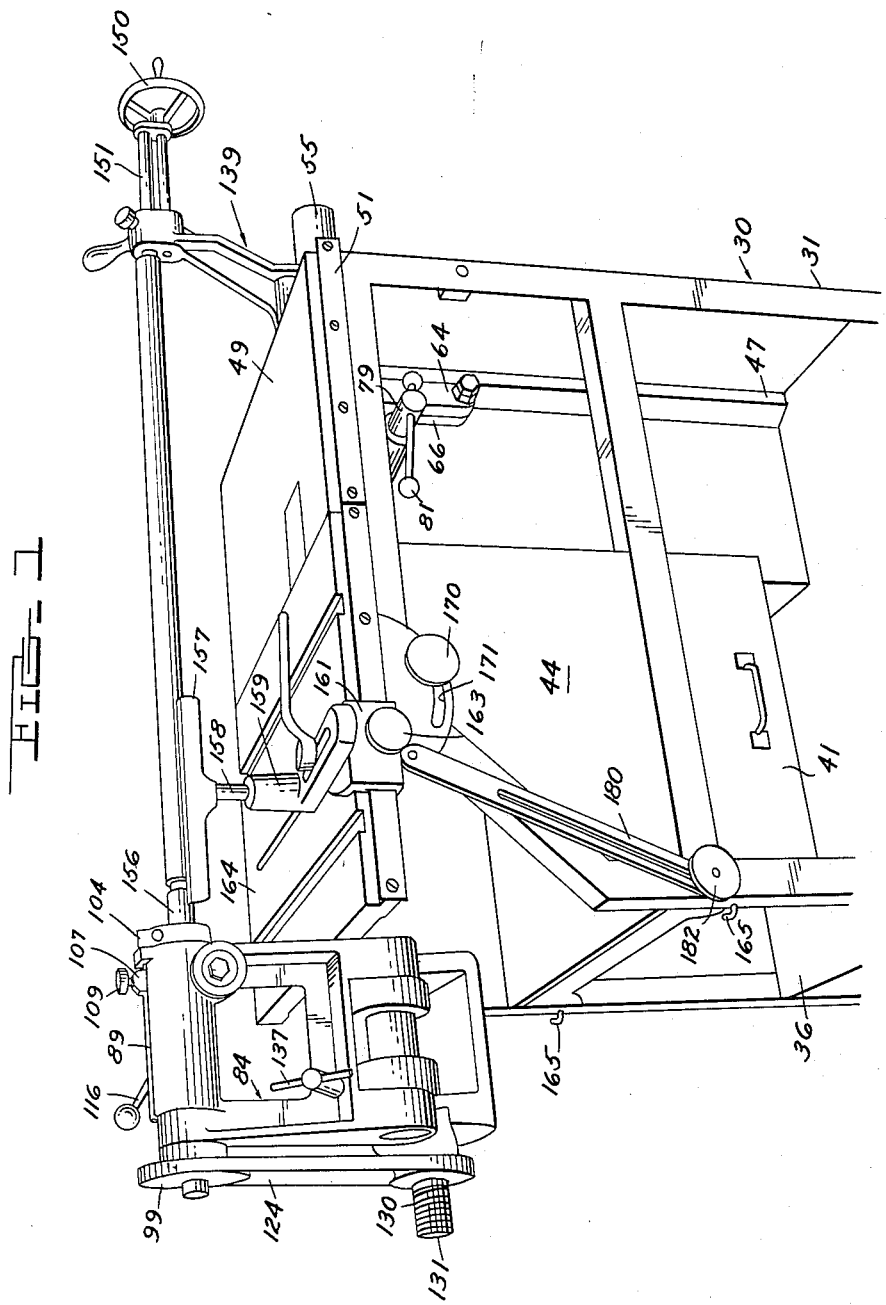
INVENTOR.
ANTHONY A. MUEHLING
BY
ATTORNEYS

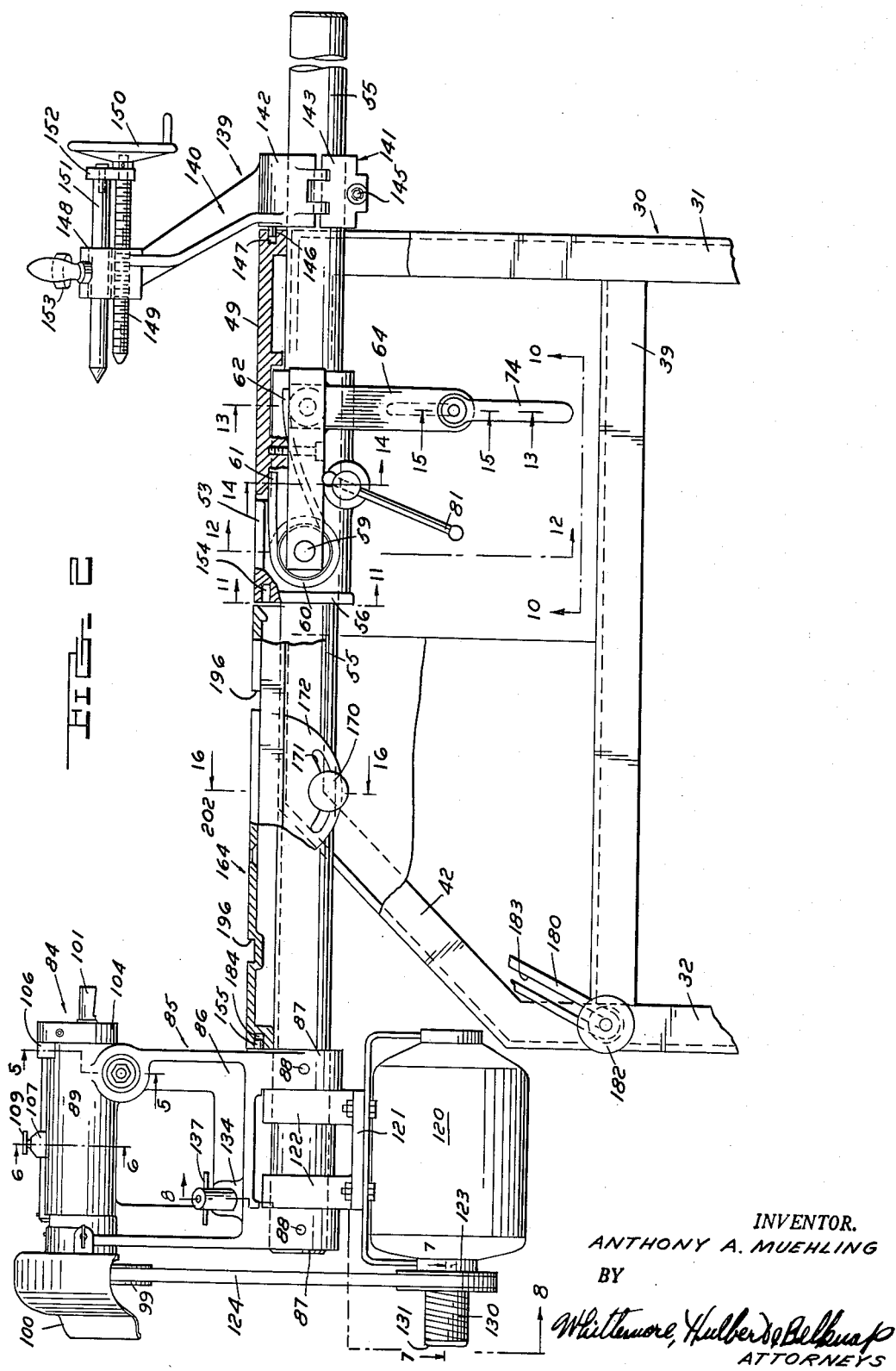

Dec. 27, 1955
A. A. MUEHLING
2,728,364
UNIVERSAL MACHINE TOOL HAVING A SWINGABLE BOOM
Filed March 16, 1953
14 Sheets-Sheet 3
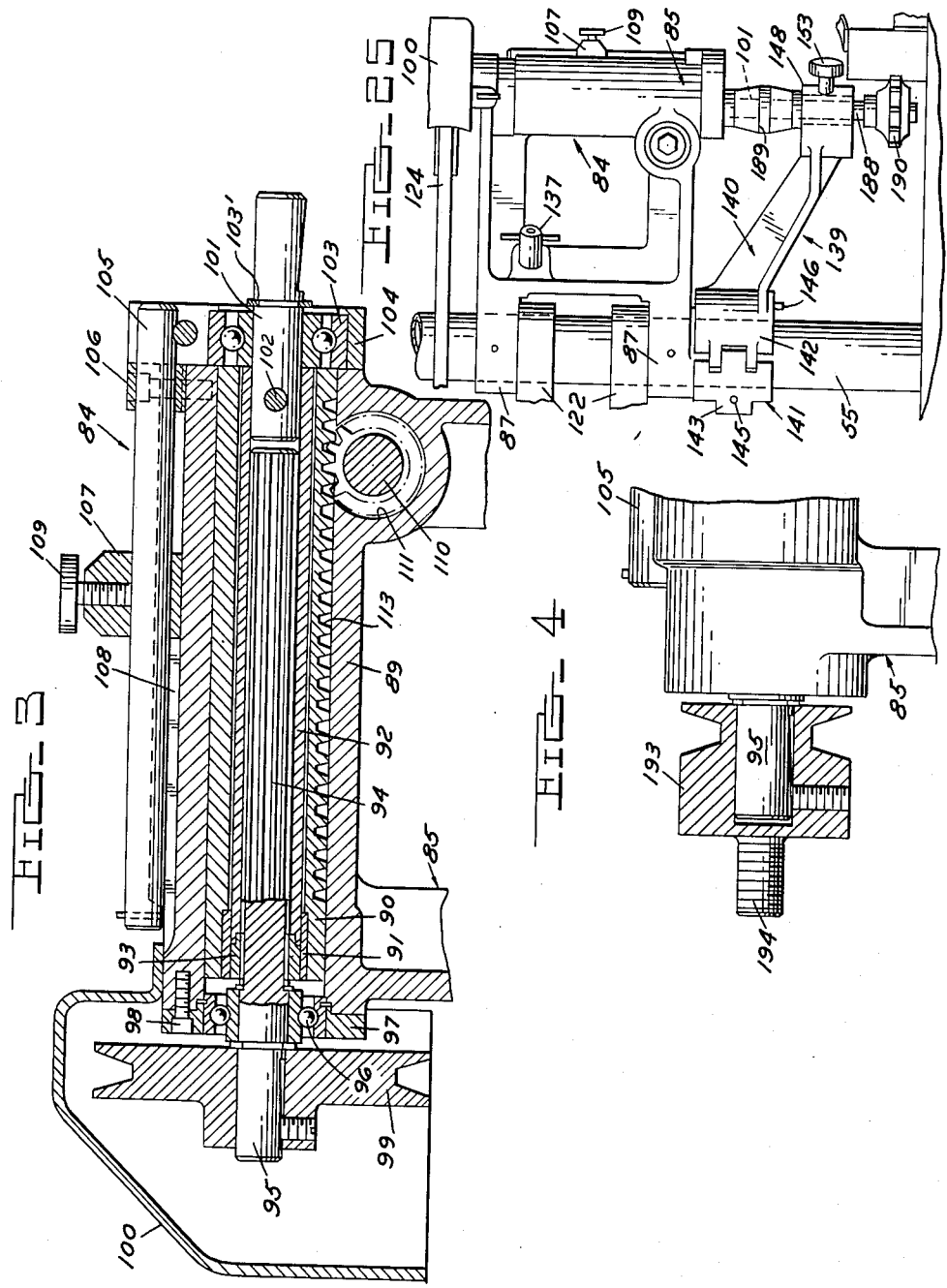
INVENTOR.
ANTHONY A. MUEHLING
BY
Whitmore, Hulbert & Belknap
ATTORNEYS

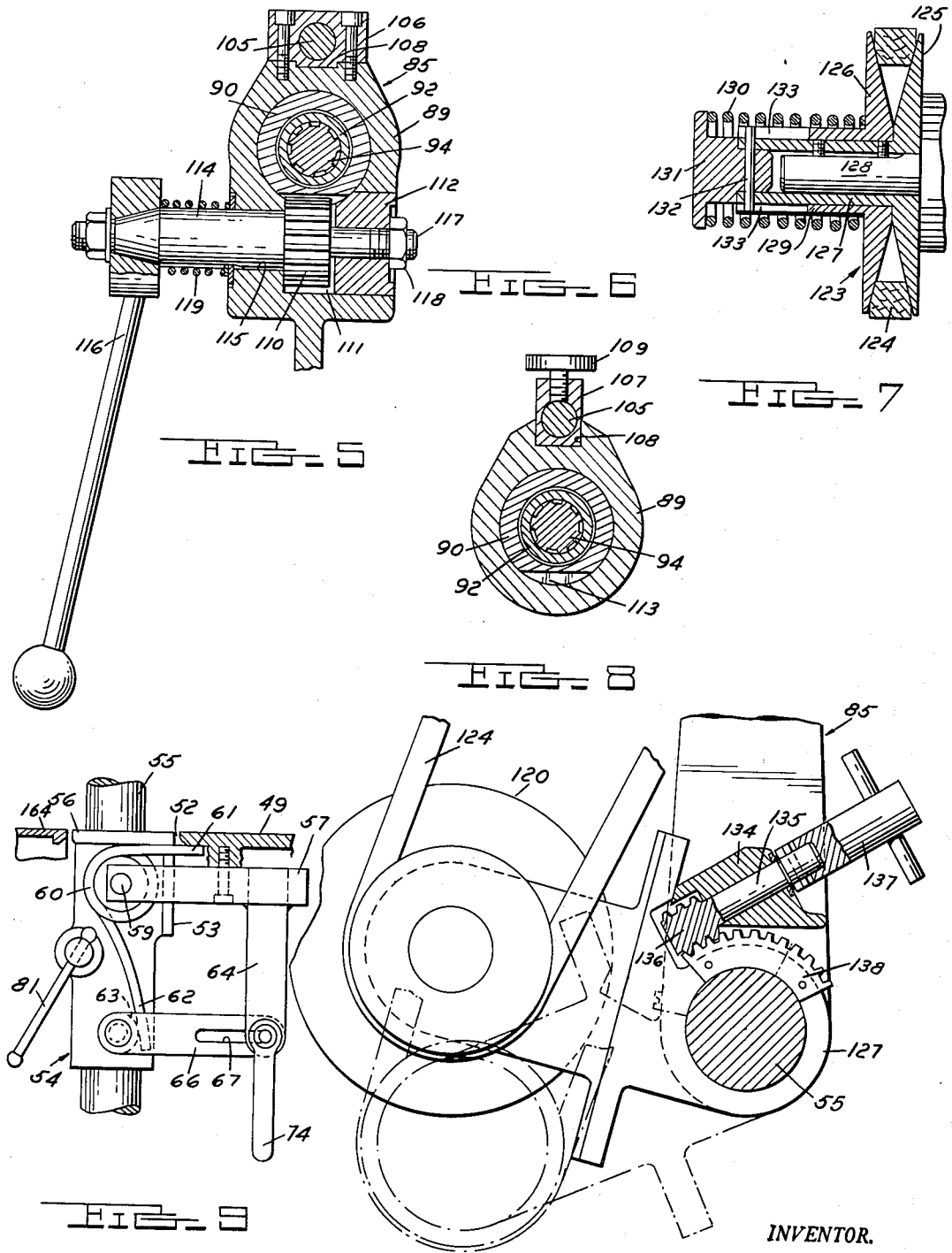

Dec. 27, 1955  A. A. MUEHLING  2,728,364
UNIVERSAL MACHINE TOOL HAVING A SWINGABLE BOOM
Filed March 16, 1953  14 Sheets-Sheet 5
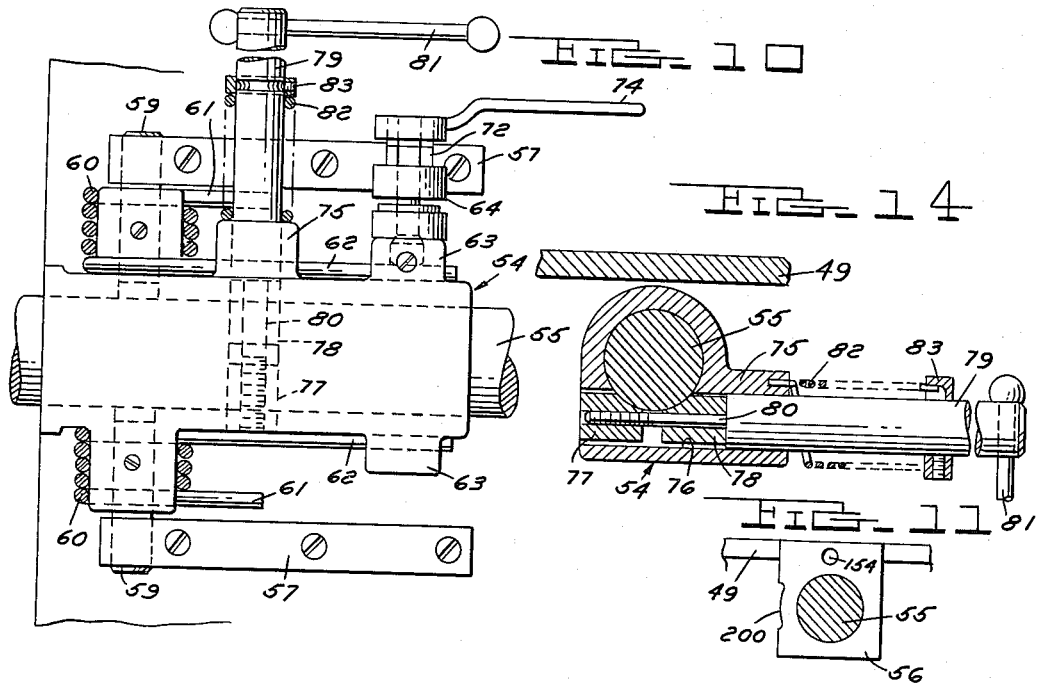
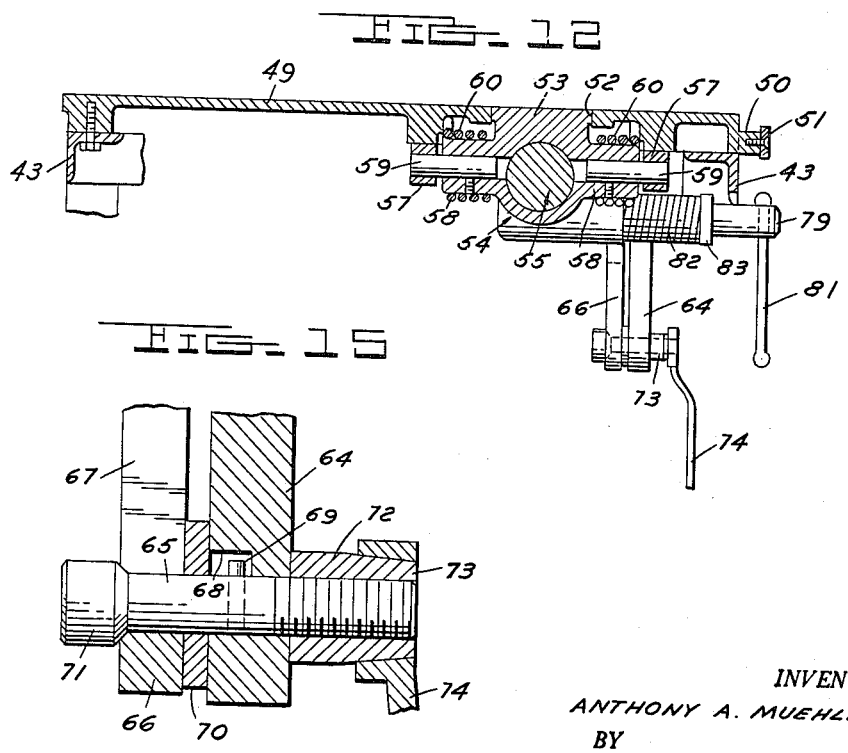
INVENTOR.
ANTHONY A. MUEHLING
BY
Whittemore, Hulbert & Belknap
ATTORNEYS

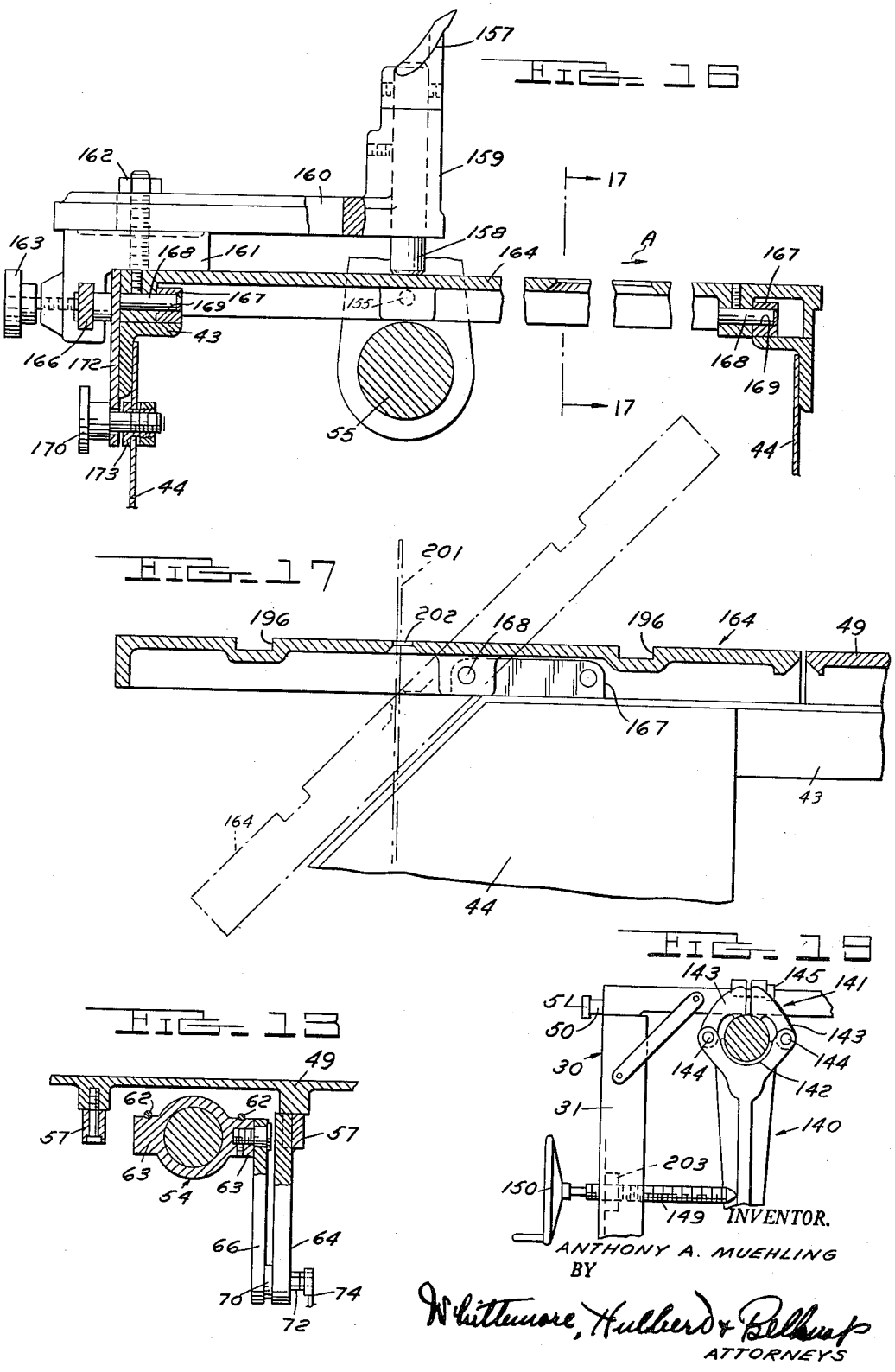

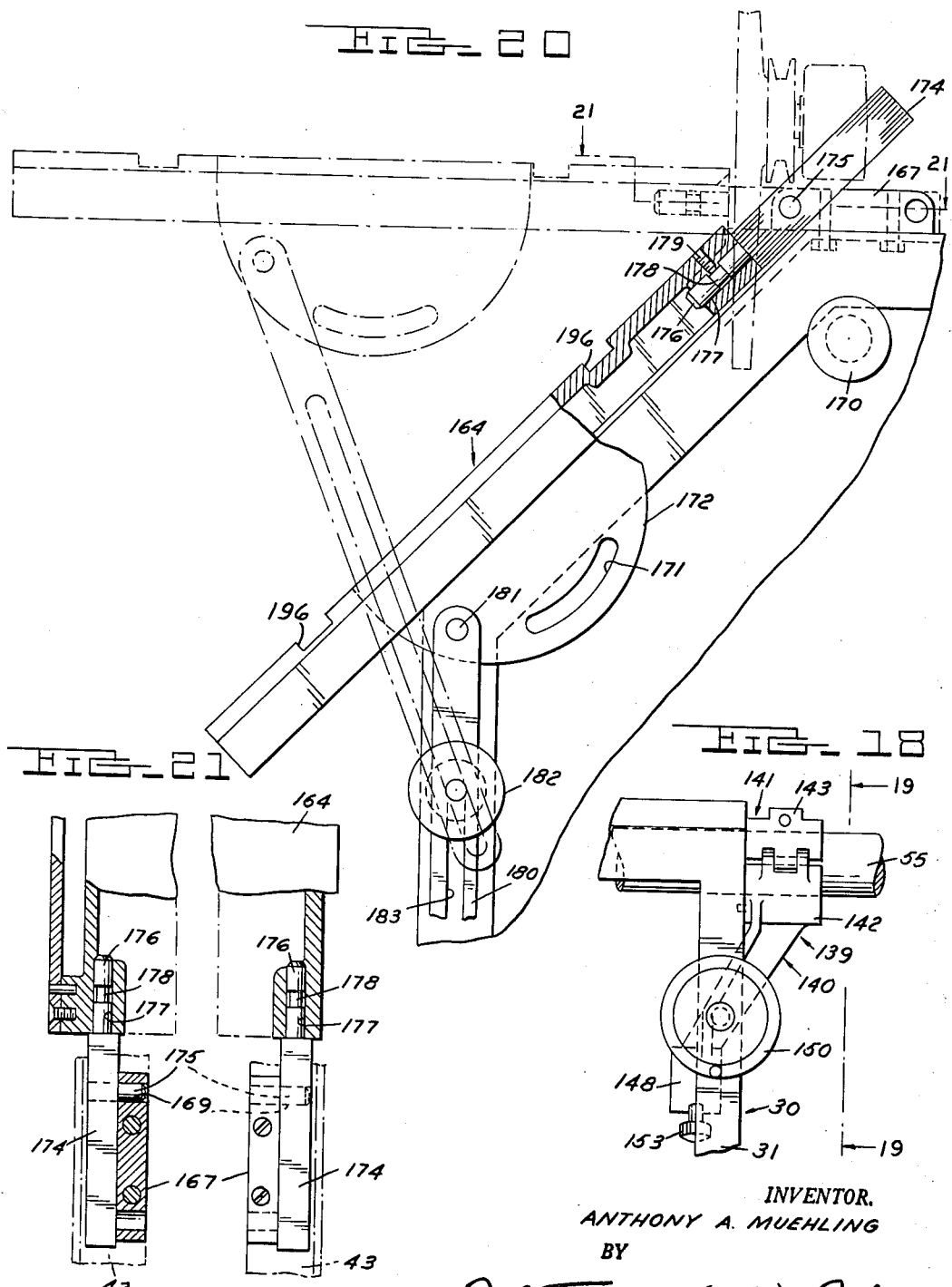

Dec. 27, 1955   A. A. MUEHLING   2,728,364
UNIVERSAL MACHINE TOOL HAVING A SWINGABLE BOOM
Filed March 16, 1953   14 Sheets-Sheet 8
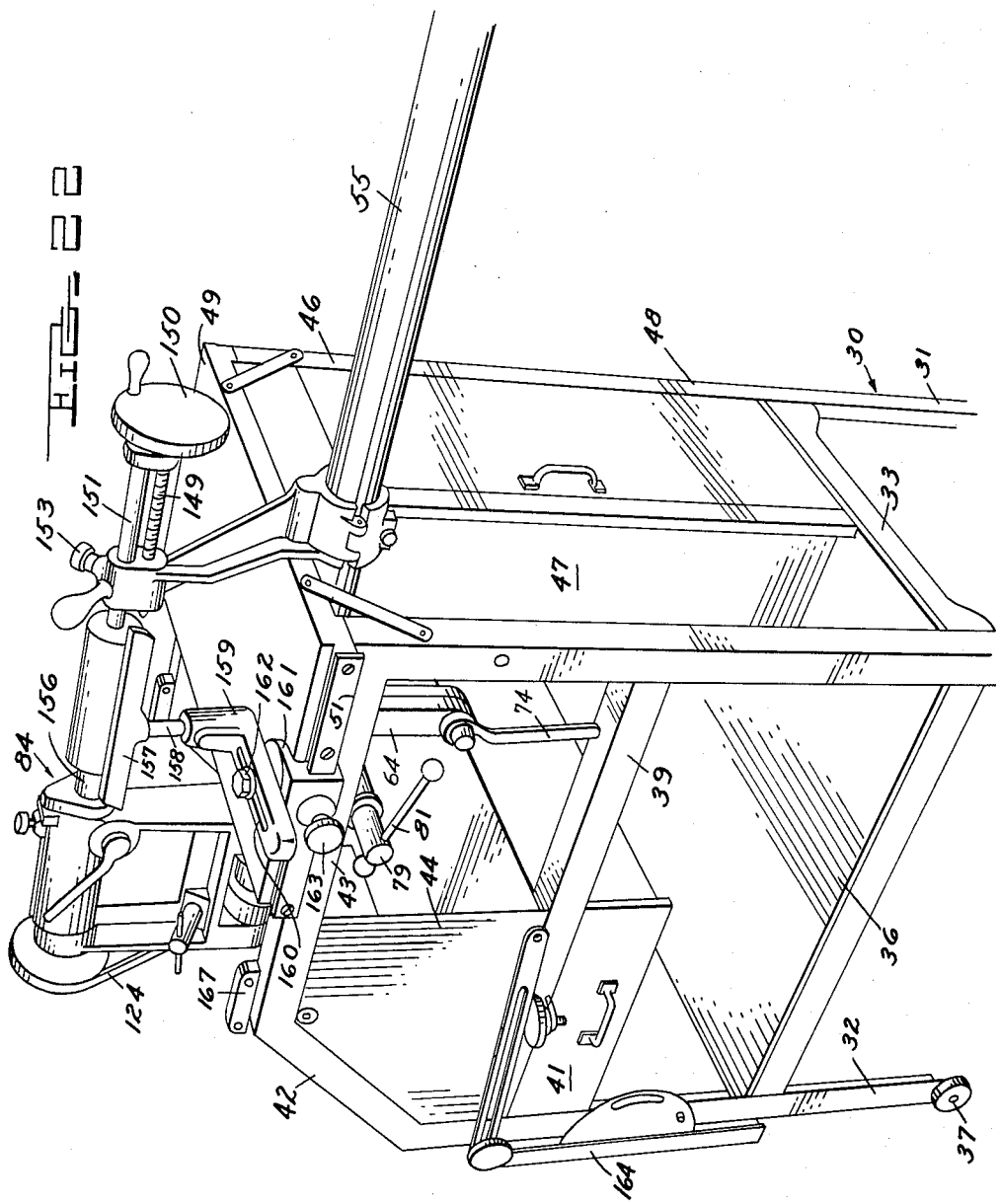
INVENTOR.
ANTHONY A. MUEHLING
BY
Whittemore, Hulbert & Belknap
ATTORNEYS

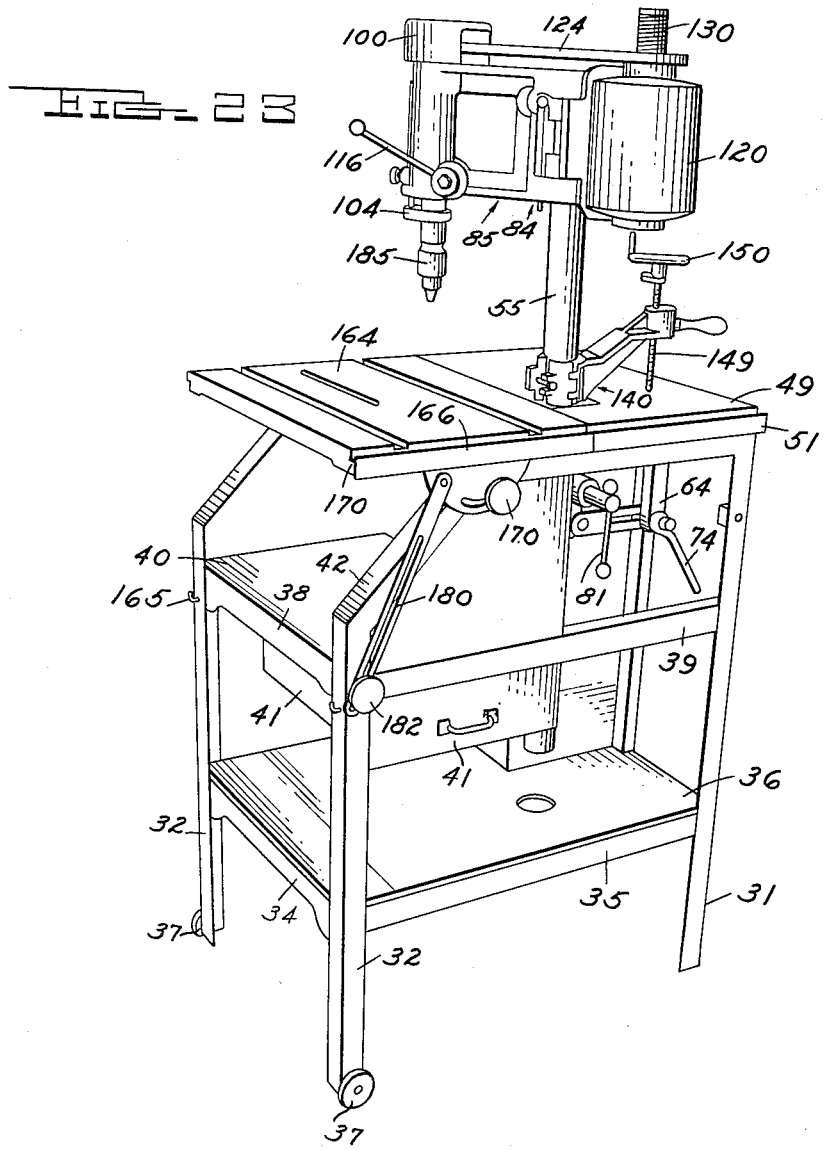

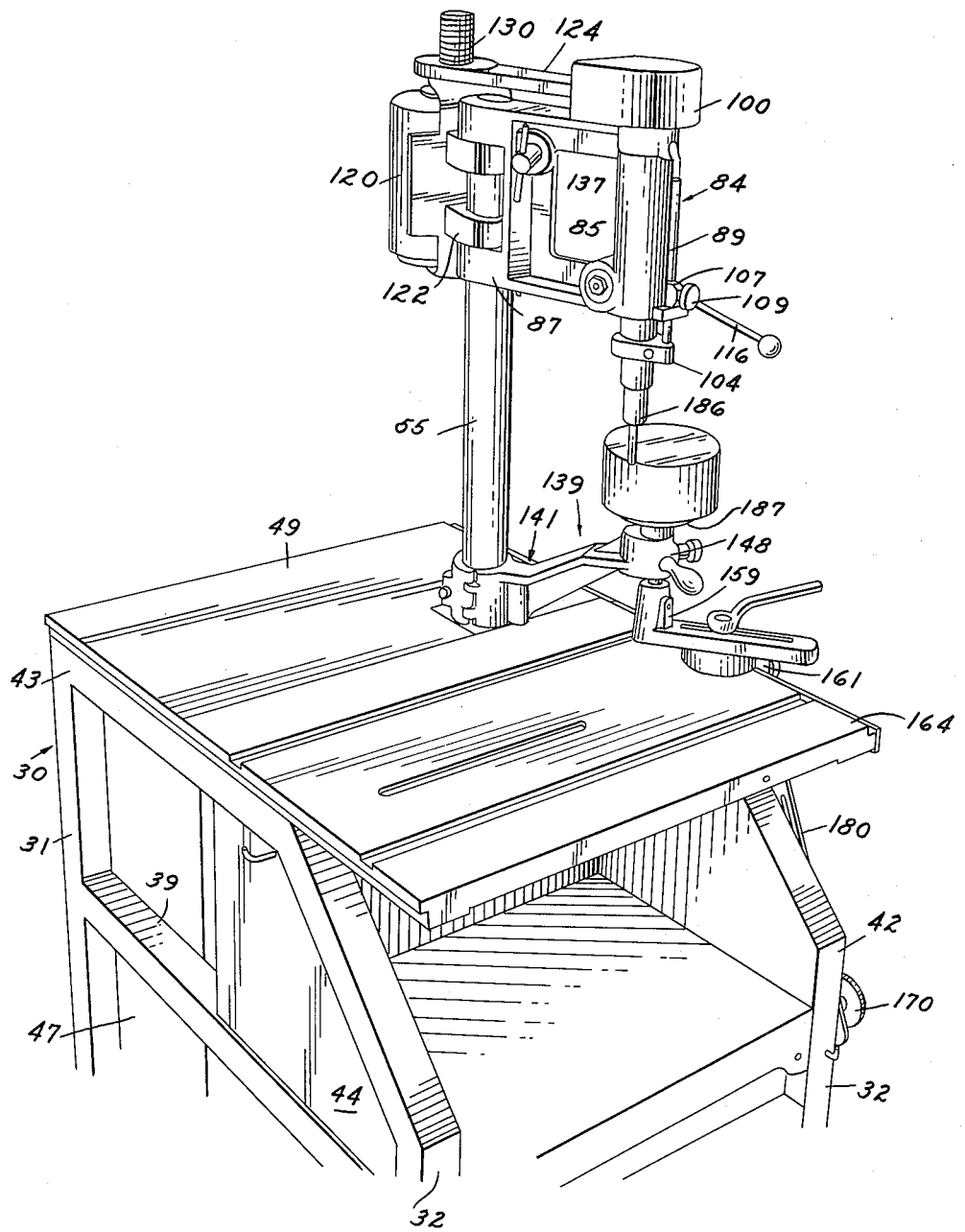

Dec. 27, 1955  A. A. MUEHLING  2,728,364
UNIVERSAL MACHINE TOOL HAVING A SWINGABLE BOOM
Filed March 16, 1953  14 Sheets-Sheet 11
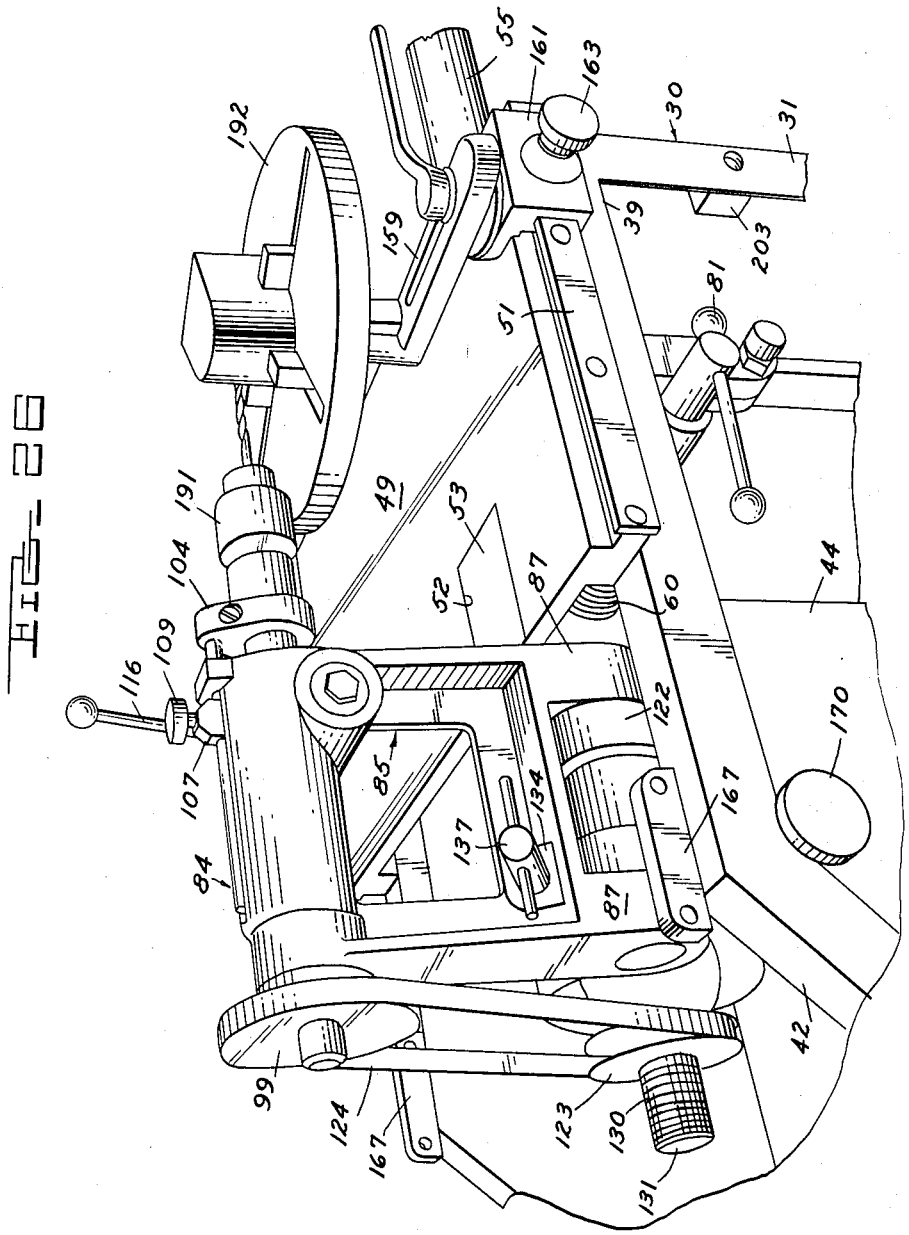
INVENTOR.
ANTHONY A. MUEHLING
BY
*Whittemore, Hulbert & Belknap*
ATTORNEYS

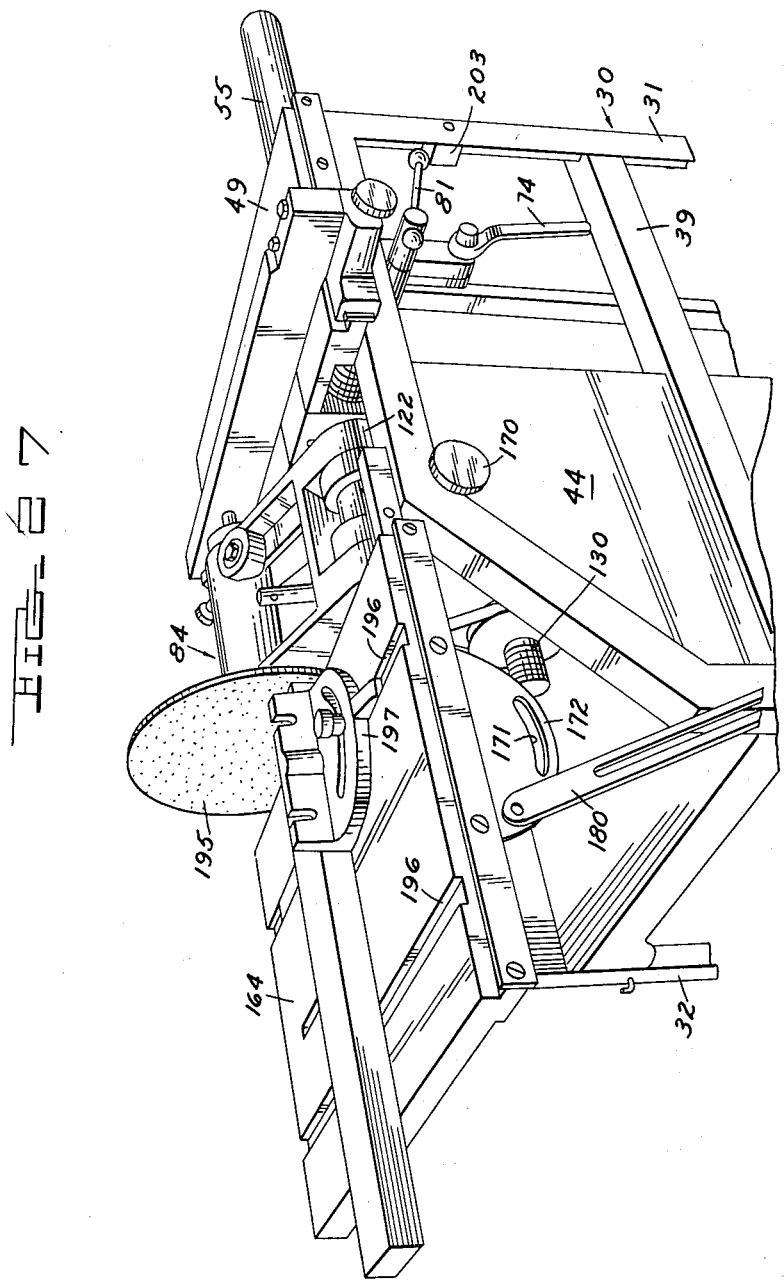

Dec. 27, 1955   A. A. MUEHLING   2,728,364
UNIVERSAL MACHINE TOOL HAVING A SWINGABLE BOOM
Filed March 16, 1953   14 Sheets-Sheet 13

INVENTOR.
ANTHONY A. MUEHLING
BY
Whittemore, Hulbert & Belknap
ATTORNEYS

Dec. 27, 1955  A. A. MUEHLING  2,728,364
UNIVERSAL MACHINE TOOL HAVING A SWINGABLE BOOM
Filed March 16, 1953  14 Sheets-Sheet 14
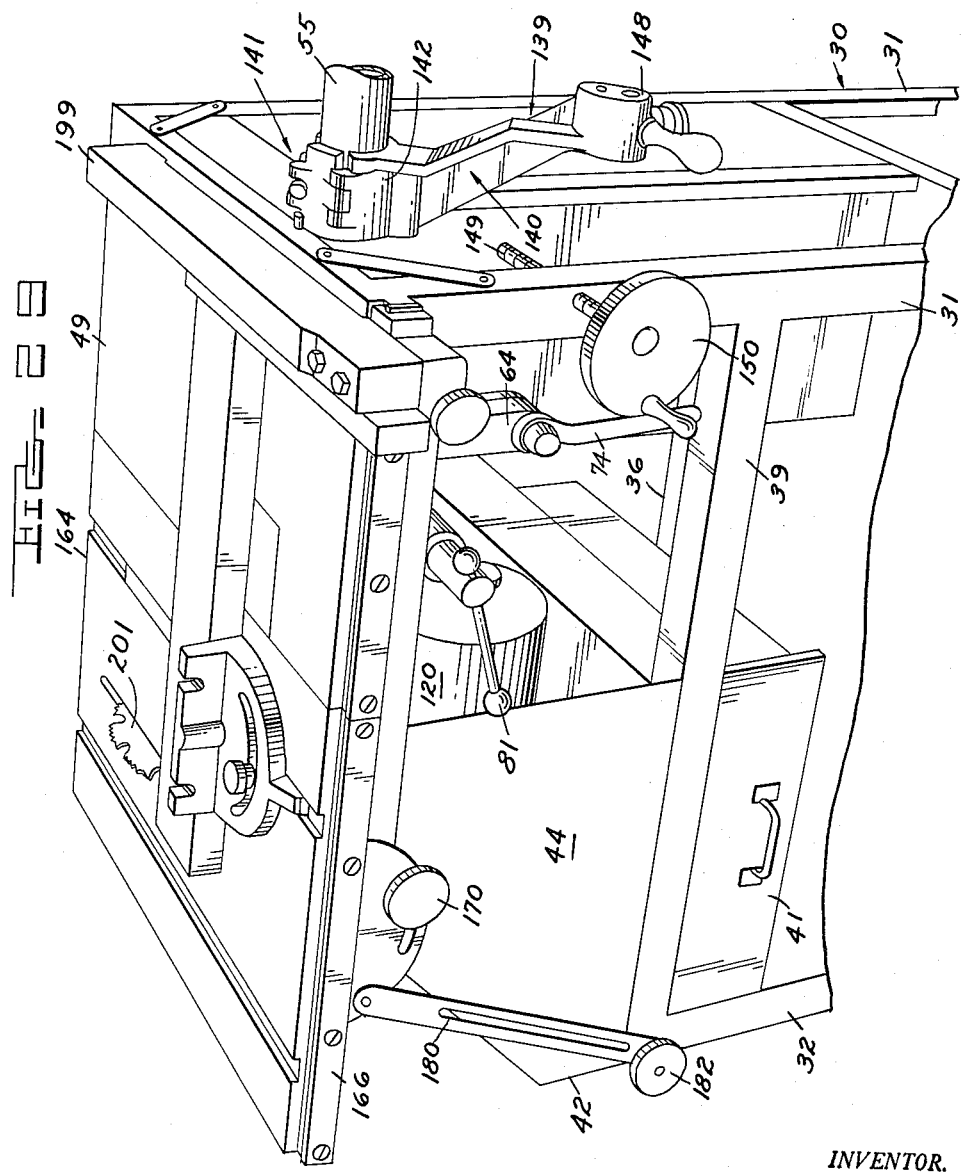
INVENTOR.
ANTHONY A. MUEHLING
BY
Whittemore, Hulbert & Belknap
ATTORNEYS

United States Patent Office 2,728,364
Patented Dec. 27, 1955

2,728,364

UNIVERSAL MACHINE TOOL HAVING A SWINGABLE BOOM

Anthony A. Muehling, Detroit, Mich.

Application March 16, 1953, Serial No. 342,654

14 Claims. (Cl. 144—1)

This invention relates generally to machine tools and refers more particularly to improvements in machine tools of the universal type.

It is an object of this invention to provide an exceptionally compact universal machine tool which, although composed of a relatively few simple parts, is capable of being readily converted to numerous different types of machines among which are a lathe, a drill press, a radial drill press, a router, a sander and a rotary saw.

It is another object of this invention to provide a universal machine tool which when converted into a lathe may be readily adjusted to turn work having an exceptionally wide range of lengths in comparison to the overall size of the machine, and may also be used for face plate or chuck turning when desired.

It is still another object of this invention to provide a universal machine tool which when converted to a drill press may be readily adjusted for horizontal, vertical or angular drilling, radial drilling in either a horizontal or vertical direction and index drilling.

It is a further object of this invention to provide a universal machine tool which when converted to either a sander or a rotary saw may be readily adjusted to sand or saw work throughout a wide range of angles.

It is a still further object of this invention to provide a universal machine tool of the foregoing type which is exceptionally stable in all of its numerous conversions and, in addition, is highly flexible in each conversion enabling the user to perform practically any desired operation on a work piece.

The present invention has as a still further object the provision of a universal machine tool wherein several basic parts of the machine such, for example, as the tail stock and tool rest perform various different operations so that all of the conversions noted above are accomplished with a minimum number of attachments or separate parts.

In addition to the foregoing the present invention contemplates numerous additional features which greatly improve the operation of the machine tool in all of its different conversions and these features as well as the foregoing will be made more apparent as this description proceeds especially when considered in connection with the accompanying drawings, wherein:

Figure 1 is a fragmentary perspective view of a machine tool embodying the features of this invention;

Figure 2 is a side elevational view of the machine tool shown in Figure 1 having certain parts broken away for the sake of clearness;

Figure 3 is a longitudinal sectional view through a part of the driving head of the machine tool;

Figure 4 is a fragmentary elevational view partly in section of the outer end of the driving head and showing an adapter attached to the driving head;

Figure 5 is a cross sectional view taken on the line 5—5 of Figure 2;

Figure 6 is a cross sectional view taken on the line 6—6 of Figure 2;

Figure 7 is a sectional view taken on the line 7—7 of Figure 2;

Figure 8 is a sectional view taken on the line 8—8 of Figure 2;

Figure 9 is a side elevational view partly in section of a portion of the machine tool shown in Figure 1;

Figure 28:
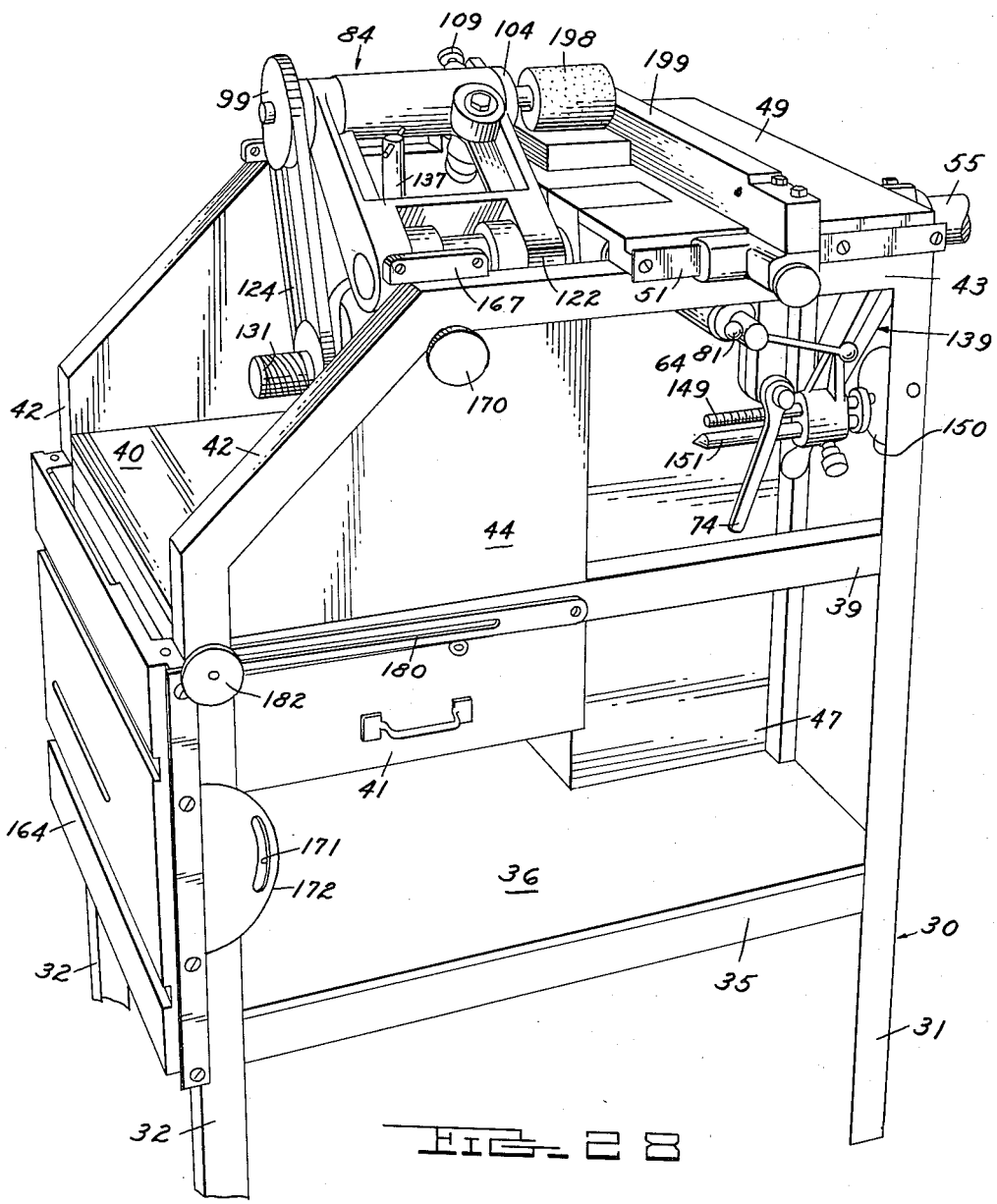

Figures 10, 11, 12, 13 (sheet 6), 14, 15 and 16 (sheet 5) are respectively sectional views taken on the lines 10—10, 11—11, 12—12, 13—13, 14—14, 15—15 and 16—16 of Figure 2;

Figure 17 (sheet 6) is a sectional view taken on the line 17—17 of Figure 16;

Figure 18 (sheet 7) is a side elevational view of a part of the machine tool and showing the tail stock in a different position from the one disclosed in Figure 2;

Figure 19 (sheet 6) is a sectional view taken on the line 19—19 of Figure 18;

Figure 20 (sheet 7) is a fragmentary side elevational view partly in section of the table structure of the machine tool;

Figure 21 is a sectional view taken on the line 21—21 of Figure 20;

Figure 22 is a fragmentary perspective view of the machine tool shown in Figure 1 having the parts in another position;

Figure 23 is a perspective view of the universal machine tool having the parts positioned to form a drill press;

Figure 24 is a fragmentary perspective view of the machine tool shown in Figure 23 and having the parts arranged to produce a milling operation;

Figure 25 (sheet 3) is a fragmentary elevational view having the parts arranged to produce a slotting or shaping operation;

Figure 26 (sheet 11) is a fragmentary perspective view of the machine tool having the parts arranged to accomplish horizontal drilling;

Figure 27 is a fragmentary perspective view of the machine tool having the parts arranged to accomplish an edge sanding operation;

Figure 28 is a perspective view of the machine tool having the parts arranged to accomplish face sanding; and Figure 29 is a fragmentary perspective view of the machine tool having the parts arranged to accomplish a sawing operation.

Basically, the machine tool forming the subject matter of the present invention comprises a table having a frame structure 30 composed essentially of angle bars welded or otherwise secured together to provide a rigid and unitary assembly. As shown in Figures 1, 22–29 inclusive, the frame structure 30 comprises laterally spaced vertical members 31 at the front end of the table and correspondingly spaced vertical members 32 at the rear end of the table. The upright members 31 are secured together in lateral spaced relationship adjacent the lower end portions thereof by cross bars 33 and the vertical members 32 are secured together in lateral spaced relationship adjacent the lower ends thereof by a cross bar 34. The vertical members 31 are also respectively connected to the vertical members 32 by side bars 35 which cooperate with the end bars 34 to form in effect a rectangular frame or support for a platform 36. It will be noted that the platform 36 is spaced vertically above the lower ends of the vertical members and provides a surface on which articles may be supported. The lower ends of the front vertical members 31 are adapted to rest on the floor and rollers 37 are respectively rotatably supported on the lower ends of the rear vertical members 32 in positions to have a rolling engagement with the floor. As a result the table may be readily transported from one position to another by merely lifting the front end thereof and rolling the same along the floor.

The vertical members 32 at the rear of the table are also connected together at a point spaced above the rear cross bar 34 by a second cross bar 38 and additional side bars 39 also respectively connect the vertical members 31 and 32 at opposite sides of the table. The side bars 39 are arranged at approximately the same elevation as the end bar 38 and cooperate with the latter to support a shelf 40 at the rear end of the table. If desired, a storage drawer 41 may be supported directly below the shelf 40 on suitable ways (not shown) carried by the frame 30. In the present instance the drawer 41 is supported for sliding movement transversely of the table and is extendable through the opening provided at one side of the frame 30.

As shown particularly in Figure 28, the upper ends of the vertical members 32 terminate short of the plane defining the top of the table and are respectively connected to frame members 42 which are inclined in a forward direction and are connected to the rear ends of side bars 43. The bars 43 extend forwardly from the frame members 42 and are respectively secured at their front ends to the upper ends of the frame members 31. Suitable plates 44 are welded or otherwise secured to opposite sides of the frame 30 in positions to form closures for opposite sides of the shelf 40.

As shown particularly in Figure 22 of the drawings, an upright frame bar 45 is secured at its lower end to the front end cross bar 33 intermediate the ends of the latter and is secured at the top to the inner end of a plate 46 having the outer end secured to the upper end of the adjacent vertical frame member 31. The upright frame bar 45 cooperates with the frame bar 33, plate 46, and adjacent vertical frame member 31 to provide an opening in the frame 30 through which access may be had to a vertically extending cabinet 47. The access opening is closed by a door 48 which is hinged along its outer vertical edge to the adjacent frame member 31 of the frame structure 30.

A plate 49 is permanently secured to the top of the frame structure 30 and forms the top of the table. The plate 49 extends for substantially the full width of the frame structure 30 and the rear edge of the plate 49 is spaced a substantial distance forwardly of the rear ends of the top side bars 43. As shown particularly in Figures 12 and 26 of the drawings a plurality of projections 50 are formed on the plate 49 at the front edge of the latter and a guide strip 51 is secured to the projections 50. The guide strip 51 extends for the full length of the front side edge of the plate 49 and in practice serves to support various implements on the table for sliding movement along the front side edge of the plate 49. The rear end edge of the plate 49 is fashioned to provide a rectangular shaped opening 52, as shown in Figures 2, 12 and 26 of the drawings. In certain applications of the machine tool, the opening 52 is closed by a plate 53 which forms the top of a mounting 54. The mounting 54 extends lengthwise of the table and forms a bearing for slidably supporting a boom 55.

The mounting 54 is also supported on the plate 49 for vertical swinging movement to enable locating the boom 55 with its axis extending horizontally beneath the plate 49 (Figure 2) or with its axis extending vertically with respect to the plate 49, as shown for example in Figure 9 of the drawings. In this connection, it will be noted that when the boom 55 is in its vertical position the opening 52 in the plate 49 is closed by a second plate 56 formed integral with the rear end of the mounting 54 and located in a plane extending at right angles to the plane of the plate 53.

Referring again to Figure 12 of the drawings, it will be noted that a pair of rails 57 are respectively secured to the under side of the plate 49 at opposite sides of the mounting 54. The rails 57 have aligned openings therethrough registering with bores respectively formed in bosses 58 which extend laterally outwardly from opposite sides of the mounting 54. Suitable pivot pins 59 are respectively secured in the bosses 58 at opposite sides of the boom 55 projecting through the mounting 54, and the outer ends of the pivot pins respectively extend through the openings provided in the rails 57. Thus, it will be seen that the mounting 54 is pivoted to the plate 49 in a manner to enable swinging the boom 55 between the horizontal and vertical positions thereof shown in the drawings.

As will be presently described, a power head of some considerable weight is supported on the rear end of the boom and in order to facilitate swinging the boom from its horizontal position shown in Figure 2, for example, to the vertical position shown in Figure 23, a pair of counterbalancing springs 60 are respectively wound around the bosses 58 on the mounting 54, as shown in Figures 10 and 12 of the drawings. The outer ends 61 of the springs 60 have a bearing engagement with the under side of the plate 49 (Figure 2) and the inner ends 62 have a bearing engagement with the under sides of suitable projections 63 (Figure 10) extending laterally outwardly from the front end of the mounting 54. The arrangement is such that the springs 60 apply a downward thrust on the outer end of the mounting 54 tending to counterbalance the weight of the power head at the rear end of the boom 55 and thereby assist in raising the boom to its vertical position.

In accordance with this invention provision is made for releasably clamping the boom 55 in either its horizontal or vertical positions. As shown in Figure 9 of the drawings, an elongated part 64 is secured at its upper end to the rear end of the rail 57 at the front side of the machine frame 30 and the lower end of the member 64 is pivoted by a pin 65 to the rear end of the link 66 having the front end pivoted to the rear end of the mounting 54.

The link 66 has an elongated slot 67 for slidably receiving the pin 65 and the member 64 has a slot 68 for receiving a pin 69 which extends transversely of the pin 65 into the slot 68, as shown in Figure 15 of the drawings. A spacer 70 is mounted on the pin 65 between the adjacent surfaces of the member 64 and the link 67. It will also be noted from Figure 15 of the drawings that the pin 65 has a head 71 of greater diameter than the width of the slot 67 for engaging the rear side of the link 66 and a nut 72 is threaded on the pin 65 at the front side of the member 64. The nut 72 has a tapered part 73, polygonal in shape, for engagement with a suitable wrench indicated by the numeral 74.

The foregoing structure is such as to enable unobstructed swinging movement of the boom 55 between horizontal and vertical positions by merely releasing the clamping action of the pin 65 on the member 64 and link 66. The clamping action is released by engaging the wrench 74 with the tapered portion 73 of the nut 72 and rotating the wrench in a direction to loosen the nut 72. In this connection it will be noted that the pin 65 is prevented from rotation by engagement of the pin 69 in the slot 68 of the member 64 so that the nut 72 may be tightened or loosened by rotation of the wrench 74. Tightening of the nut 72 of course clamps the fixed member 64 and pivoted link 66 together and securely holds the boom 55 in place.

For reasons to be more fully hereinafter described, the boom 55 is also movable axially relative to the mounting 54 and this is accomplished by the structure shown in Figures 10 and 14 of the drawings. In detail, the mounting 54 has a boss 75 extending toward the front side of the machine and spaced rearwardly from the mounting pivot pins 59. The boss 75 has a bore 76 which extends through the lower portion of the mounting at right angles to the boom 55 and is adapted to receive the adjacent portion of the boom 55. A pair of clamping members 77 and 78 are supported in the bore 76 in axial alignment and the adjacent ends of the members are shaped to have a bearing engagement with the exposed arcuate surface of the boom 55. The clamping members are operated by a shaft 79 having the outer end positioned at the front side of the machine and having the inner end extending into the outer end of the bore 76. A rod 80 of a diameter considerably less than the shaft 79 is welded at the outer end to the inner end of the shaft 79 in axial alignment with the latter. The clamping member 78 is slidably mounted on the rod 80 and the inner end of the rod is threaded for threadably engaging the clamping member 77.

The above construction is such that rotation of the shaft 79 in one direction draws the clamping members into clamping engagement with the boom 55 and rotation of the shaft 79 in the opposite direction releases the clamping members from clamping engagement with the boom 55. A suitable handle 81 is secured to the outer end of the shaft 79 in a position to be conveniently manipulated by the operator at the front side of the machine frame 30. In the present instance, the clamping members 77 and 78 are normally maintained in clamping engagement with the boom 55 by a coil spring 82 which surrounds the shaft 79 at the front side of the mounting 54. The inner end of the coil spring is anchored to the boss 75 and the outer end of the coil spring is anchored to a collar 83 which is secured to the shaft 79 in axial spaced relationship to the boss 75. The construction is such that as soon as the operator releases the handle 81, the shaft 79 is rotated by the spring 82 in a direction to move the clamping members 77 and 78 into clamping engagement with the boom 55.

It has been stated above that a power head is mounted on the rear end of the boom 55. This power head is indicated in the several figures of the drawings by the numeral 84 and is shown in Figure 2 as having a frame 85. The frame 85 has a base 86 formed with axially spaced sleeves 87 which are mounted on the rear end of the boom 55 and are secured to the boom by pins 88.

Referring now to Figure 3 of the drawings, it will be noted that the upper end of the frame 85 is fashioned with a tubular part 89 having its axis extending generally parallel to the axis of the boom 55. Supported within the tubular part for sliding movement axially of the same is a sleeve 90 and the rear end of the sleeve has a bearing 91 therein for sliding engagement with a tube 92 which extends axially through the sleeve 90. Secured to the rear end of the tube 92 in coaxial relationship thereto is a collar 93 having splines which extend axially of the tube 92 and slidably engage suitable splines 94 formed on a shaft 95. The rear end of the shaft 95 is journaled in a ball bearing 96 which in turn is supported within a ring 97 secured to the rear end of the tubular part 89 by fastener elements 98. A pulley 99 is secured to the rear end of the shaft 95 and may be protected by a shield 100.

The front end of the shaft 95 terminates short of the corresponding end of the tube 92 and a driving shaft 101 extends into the front end of the tube 92 and is secured to the latter by a pin 102. The driving shaft 101 is journaled in a ball bearing 103 having the outer race secured in a holder 104 and having the inner race secured to the driving shaft 101. As shown in Figure 3 of the drawings, the holder 104 is positioned at the front end of the power head 84 and the bearing 103 in the holder is engaged by the front end of the sleeve 90. Inasmuch as the bearing 103 is held against axial displacement relative to the driving shaft 101 it follows that forward movement of the sleeve 90 from the position thereof shown in Figure 3 imparts a corresponding movement to the shaft 101 and the tube 92. The upper end of the holder 104 is secured to the front end of a guide rod 105 which extends parallel to the shaft 95 and is slidably supported on the top of the tubular part 89 by a bearing 106. Slidably mounted on the rod 105 is a stop 107 having the lower end slidably engageable in a groove 108 formed in the top of the tubular part 89 and extending parallel to the guide rod 105. A thumb screw 109 is threadably mounted on the top of the stop 107 in a manner to frictionally engage the guide rod 105 to hold the stop 107 in different positions lengthwise of the rod 105.

It follows from the foregoing that the driving shaft 101 is not only supported for rotation but is also movable in the direction of its axis and the extent of axial forward movement may be varied by adjusting the stop 107 on the guide rod 105. Axial movement of the driving shaft 101 is accomplished in the manner indicated in Figures 3 and 5 of the drawings wherein it will be noted that the frame 85 is fashioned at the front end thereof to accommodate a gear 110. More particularly, it will be noted from Figure 5 that the gear 110 is located within a recess 111 formed in one side of the frame 85 and normally closed by a cap 112. The recess 111 intersects the opening through the tubular part 89 of the frame 85 and the teeth on the gear 110 mesh with rack teeth 113 formed on the underside of the sleeve 90. The gear 110 is driven by a shaft 114 which extends through an opening 115 in the frame 85 and has a handle 116 suitably secured to the outer end thereof. The cap 112 is secured in place by a stud 117 extending axially from the gear 110 through the cap 112 and having a nut 118 secured to the outer end thereof. The shaft 114 is normally rotated in a direction to maintain the shaft 101 and associated parts in the retracted position shown in Figure 3 of the drawings and this is accomplished by a coil spring 119. The coil spring 119 surrounds the shaft 114 between the hub of the handle 116 and the adjacent side of the frame 85. One end of the coil spring 119 is anchored to the handle 116 and the other end is anchored to the frame 85. The arrangement is such that the spring 119 serves to automatically return the driving shaft 101 to its retracted position upon release of the handle 116.

The driving shaft 101 is rotated by an electric motor 120 secured to a bracket 121 having axially spaced upwardly extending projections 122. As shown in Figure 2 of the drawings, the projections 122 extend between the portions 87 on the frame 85 and are formed with aligned openings therethrough for receiving the boom 55. The drive shaft of the electric motor 120 has a pulley 123 mounted thereon and this pulley is connected to the pulley 99 on the shaft 95 by a belt 124.

The pulley 123 is of the variable speed type and comprises two sections 125 and 126 which cooperate to form the belt receiving groove of the pulley 123, as shown in Figure 7 of the drawings. The section 125 forms one side of the pulley and has a tubular part 127 keyed to the drive shaft 128 of the motor 120. The part 126 forms the opposite side of the pulley and has a sleeve 129 slidably mounted on the tubular part 127. The section 126 is yieldably urged in a direction toward the section 125 by means of a coil spring 130 surrounding the sleeve 129 and having the front end abutting the section 126. The rear end of the spring abuts a radially extending flange formed on an abutment 131 having a reduced portion sleeved into the rear end of the tubular part 127 and secured thereto by a pin 132. The pin 132 extends transversely of the abutment 131 and the extremities respectively engage in longitudinally extending open-ended slots 133 formed in opposite sides of the sleeve 129. The construction is such that the spring 130 normally urges the section 126 toward the section 125 to provide a belt receiving groove of maximum diameter in the pulley 123.

Referring again to Figure 7, it will be noted that the adjacent belt engaging surfaces of the sections 125 and 126 converge from the periphery of the pulley 123 and have in effect a camming engagement with opposite sides of the belt 124. It follows from the above that when the stress applied to the belt 124 exceeds the force exerted on the section 126 by the spring 130, the section 126 moves axially away from the section 125 to reduce the effective diameter of the pulley 123.

With the above in view, reference is made to Figure 8 of the drawings wherein it will be noted that the frame 85 is fashioned with a boss 134 and this boss has an angularly extending bore therethrough for receiving a shaft 135. The inner end of the shaft has a worm 136 secured thereto and the outer end of the shaft has a handle 137 secured thereto. The worm 136 meshes with a worm gear segment 138 which is secured to the rear side edge of the rearwardmost projection 122 on the bracket 121. The arrangement is such that rotation of the shaft 135 by the handle 137 swings the motor 120 about the axis of the boom 55 to either tighten or loosen the belt 124 depending upon the direction of rotation of the shaft 135. As a result of the above, the effective diameter of the pulley 123 is changed and the speed of rotation of the driving shaft 101 is varied accordingly.

Mounted on the boom 55 at the front side of the table is a tail stock assembly 139 comprising a support having sections 140 and 141. The section 140 has a portion 142 at the inner end semicircular in shape for bearing engagement with the boom 55 and the section 141 has two parts 143 respectively pivotally connected to opposite ends of the semicircular portion 141 by pins 144, as shown in Figure 19 of the drawings. The parts 143 of the section 141 cooperate with the portion 142 to encircle the boom 55 and the free ends of the parts 143 are removably secured together by a stud 145. In Figure 2 of the drawings, the tail stock assembly 139 is in its upright position with respect to the plate 49 and is held in the upright position by a pin 146 projecting rearwardly from the portion 142 into a recess 147 formed in the front edge of the plate 49.

The top of the section 140 is fashioned with an enlargement 148 having an internally threaded bore extending therethrough in parallel relationship to the axis of the boom 55. A screw 149 threadably engages the bore in the enlargement 148 and a hand wheel 150 is secured to the front end of the screw 149. The enlargement 148 is provided with a second bore immediately above the threaded bore and a center 151 is slidably supported in the second bore. The front end of the center is secured to a connector 152 which has a portion journaled on the front end of the screw 149 adjacent the hand wheel 150. As a result of the above construction the center 151 is moved axially in response to feeding of the screw 149 by the hand wheel 150. The center 151 may be held in any one of its numerous adjusted positions by means of a frictional lock comprising a thumb screw 153 threadably supported on the enlargement 148 and frictionally engageable with the center 151.

With the above in view, reference is now made to Figure 22 of the drawings wherein it will be noted that the machine tool has been converted to a relatively small wood working lathe. It will be noted that the boom 55 is in a horizontal position and has been adjusted axially forwardly relative to the plate 49 to locate the power head 84 against the rear edge of the plate 49. In this connection, attention is directed to Figure 2 wherein it will be noted that the rear edge of the plate 49 has a recess 154 for engaging a pin 155 projecting forwardly from the frame 85 of the power head 84. The purpose of this arrangement is to hold the power head 84 in an upright position with respect to the plate 49. Also, the tail stock assembly 139 is positioned on the boom at the front edge of the plate 49 wherein the pin 146 on the tail stock assembly engages in the recess 147 in the front edge of the plate 49.

When the machine tool is being used for a wood turning lathe, a driver 156 (not shown in detail herein) is attached to the front end of the driving shaft 101 and has the usual means for engaging one end of a work piece to be turned. The other end of the work piece is engaged by the center 151 in the usual manner. Also in accordance with conventional practice, a tool rest 157 is mounted on the upper end of a vertical post 158 having the lower end removably secured in a vertical bore formed in a bracket 159. The lower end of the bracket 159 has an elongated slot 160 therethrough for receiving a vertical stud projecting upwardly from a bracket 161. A clamping nut 162 is provided for securing the bracket 159 to the bracket 161. The bracket 161 is slidably supported on the rail 51 and is secured in any desired adjusted position by a thumb screw 163.

In some cases, it may be desirable to increase the capacity of the lathe shown in section 22 and in this respect attention is called to Figures 1 and 2 of the drawings wherein a plate 164 is supported on the frame 30 between the rear edge of the plate 49 and the power head 84. The plate 164 forms in effect a continuation of the plate 49 and when not in use is supported at the rear end of the frame 30 on suitable hooks 165, as shown in Figures 1, 23 and 28 of the drawings. The plate 164 is similar in construction to the plate 49 and has a guide rail 166 at the front side thereof which forms a continuation of the guide rail 51 on the front side of the plate 49.

As shown in Figures 16, 17, 20 and 21, the plate 164 is pivoted on the frame 30 for vertical swinging movement relative to the plate 49. For accomplishing this result a pair of blocks 167 are respectively secured to the top side bars 43 of the frame 30 at the rear ends of the bars 43. The front edge of the plate 164 overlies the blocks 167 and suitable pins 168 are secured to the plate 164 at the under side of the latter and adjacent opposite side edges of the plate 164. The pins 168 are axially aligned and extend transversely of the plate 164. As shown in Figure 16, the pins 168 are arranged on the plate 164 in a manner such that lateral shifting movement of the plate in the direction of the arrow A extends the free ends of the pins into openings 169 formed in the blocks 167. In any case, the pins 168 pivotally support the plate 164 for swinging movement between the full and broken line positions thereof shown in Figure 17.

The plate 164 is held in the horizontal position thereof shown in Figures 1 and 2 of the drawings by a clamping screw 170 positioned at the front side of the frame 30 for convenient manipulation by the operator and having a shank portion projecting through an arcuate slot 171 formed in a plate 172 secured to the front side of the frame 30. As shown in Figure 16, a nut 173 is secured to the plate 44 at the front side of the frame 30 in a position to threadably engage the shank of the clamping screw 170. The axis of the clamping screw 170 is located in a common vertical plane with the aligned axes of the pivot pins 168, and the slot 171 is concentric to the aligned axes of the pivot pins 168. The arrangement is such that when the clamping screw is loosened the plate 164 may be swung about the axes of the pivot pins 168 and clamped in any desired angular position by tightening the screw 170.

For reasons to be more fully hereinafter described, it is necessary to provide sufficient clearance between the adjacent edges of the plates 49 and 164 to accommodate the power head 84. In this connection, attention is directed more particularly to Figures 20 and 21 wherein it will be noted that a pair of adaptors 174 are respectively positioned in bearing engagement with the blocks 167 and have pins 175 which respectively engage in the openings 169 in the blocks 167. The adaptors 174 project rearwardly from the blocks 167 and terminate in pins 176 which respectively extend into bores 177 formed in the front end of the plate 164, as shown in Figure 21 of the drawings. The pins 176 have reduced portions 178 intermediate the ends and set screws 179 are provided for holding the adaptors 174 in assembled relationship with the plate 164. It follows from the above that the adaptors 174 support the front edge of the plate 164 for vertical swinging movement about the axes of the pins 175 and permit moving the plate 164 to the full and broken line positions thereof shown in Figure 20.

In order to support the rear portion of the plate 64 from the frame 30 a link 180 is provided at the front side of the frame 30. The upper end of the link 180 has a pin 181 which is removably engageable with an opening provided in the plate 172 and the lower end of the link 180 is attached to the rear end of the frame 30 by a clamping screw 182. The clamping screw 182 is similar to the clamping screw 170 and the threaded shank portion is secured to the machine frame 30 in the same manner as the clamping screw 170 is secured to the plate 44 in Figure 16 of the drawings. The threaded shank of the clamping screw 182 extends through an elongated slot 183 formed in the link 180. It will be understood that when the plate 164 is supported by the adaptors 174 and link 180, the clamping screw 170 is removed from the plate 172. The length of the slot 183 in the link 180 is sufficient to enable swinging the plate 164 to the extreme positions shown in Figure 20 and the plate 164 is clamped in either of the positions shown by the screw 182.

It will be apparent from the foregoing description that the machine tool may be readily adapted for turning work having a wide variation in length. The available capacity of the machine as a turning lathe is clearly indicated in Figures 1 and 22 of the drawings. It is important to note that when the machine is set up to function as a lathe, a face plate or chuck may be secured to the driving shaft 101 in place of the driver 156 and the tool rest 157 may be positioned to enable turning the face of a work piece. In this connection, reference is again made to Figure 2 of the drawings wherein it will be noted that the rear edge of the plate 164 has an opening 184 for receiving the pin 155 on the power head 84 to hold the latter in its upright position. In the event face turning is desired when the machine is set up as a relatively short lathe (Figure 22), the tail stock assembly 139 may either be removed entirely or swung downwardly to the position shown in Figure 28, for example.

In Figure 23 of the drawings, the machine tool is shown as converted to a drill press. Briefly, the boom 55 has been swung to its vertical position wherein the power head 84 is located at the top of the boom. It is to be understood that the boom is swung to its vertical position before installing the plate 164. Also, a drill chuck 185 of conventional design is secured to the driving shaft 101 of the power head 84. In addition, Figure 23 of the drawings illustrates the tail stock assembly as installed on the boom in a reverse position from that shown in Figures 1 and 22. The center 151 is removed from the tail stock assembly and the screw 149 may be used as a vertical feed for the boom 55, or in some instances as a means for clamping the work piece to the table during operation of the tool.

Although the table 164 is shown in a horizontal position in Figure 23, it will be noted that this table may be swung to an angular position with the result that inclined holes may be drilled in the work supported on the plate 164. Also, the plate 164 may be removed and holes may be drilled in the end of a relatively long work piece by supporting the lower end of the work piece on the shelf 40.

Figure 24 shows the machine tool as converted to a vertical type mill. Briefly, the drill chuck 185 shown in Figure 23 is replaced by a milling tool 186 and the feed screw 149 is removed from the tail stock assembly 139. The work to be milled is secured to a face plate 187 having a vertical shaft rotatably supported by both the tail stock assembly 139 and the tool post holder 159. If desired, the tail stock assembly may be omitted to enable tilting the plate 164 to different angular positions should it be desired to angularly locate the work piece relative to the tool.

In Figure 25 of the drawings, sheet 3, the boom 53 is also supported in a vertical position and the tail stock 139 is mounted on the boom 53 in its normal position below the power head 84. The drive shaft 101 of the power head is connected to a vertical shaft 188 by an adaptor 189. The shaft 188 is journaled in the enlargement 148 of the tail stock assembly 139 and a routing tool 190 is secured to the lower end of the shaft 188. Such an arrangement is especially advantageous in forming grooves in a work piece.

In Figure 26, the machine tool is shown with the boom 55 in a horizontal position and with the tail stock 139 and plate 164 removed. A conventional chuck 191 is removably secured to the driving shaft 101 and a drill is supported by the chuck. A work holding chuck 192 is rotatably supported by the tool post holder 159 enabling the work to be rotated to different angular positions relative to the drill.

In Figure 27 the machine tool is shown as converted to a sanding machine. Briefly, the boom 55 extends horizontally beneath the plates 49 and 164, and the plate 164 is supported by the adaptors 174 in spaced relationship to the plate 49. The boom 55 is adjusted along its axis to locate the power head 84 between adjacent edges of the plates 49 and 164. Also the pulley 99 is replaced by a pulley 193 (Figure 4) having a stud 194 on which a sanding disc 195 is secured. The work to be sanded is supported on the plate 164 and the top of the plate 164 has grooves 196 for guiding a fence or other suitable tool 197. It is apparent that the plate 164 may be adjusted angularly relative to the disc 195 to enable sanding angular surfaces of the work piece.

In Figure 28 of the drawings, the machine tool is shown as converted to a sanding machine of a somewhat different type. Briefly, a sanding drum 198 is secured to the driving shaft 101 and the power head 84 is held in an angular position to enable engaging the drum with a flat surface on the work piece. The work piece is guided along the plate 49 by a fence 199 removably clamped to the plate 164. The power head 84 is held in the position shown in Figure 28 by engagement of the pin 155 in a recess 200 formed in one side of the portion 56 of the mounting 54, as shown in Figure 11 of the drawings.

In Figure 29 of the drawings, the machine tool is shown as converted to a power saw of the disc type. In this arrangement the boom extends horizontally below the plates 49 and 164. Also, the power head 84 is swung downwardly to a position wherein it is located beneath the plate 164. Also, the pulley 99 is replaced by the pulley 193 and a circular saw 201 is secured to the stud 194. The boom 55 is angularly positioned to enable the periphery of the saw to project upwardly through a slot 202 (Figure 17) formed in the plate 164, and it will be noted that the opposite side edges of the slot 202 diverge in a downward direction to provide ample clearance for the saw in any angular position of the plate 164 between the full and broken line positions shown in Figure 17.

In some of the above instances where the boom is supported in a horizontal position it may be desired to provide a feed for rotating the boom and, hence, the tool supported by the power head 84. Should such practice be desirable the vertical frame member 31 at the front side of the machine is provided with a nut 203 for threadably engaging the feed screw 149 of the tail stock assembly 139, as shown in Figures 18 and 19 of the drawings. The tail stock 139 with the exception of the screw 149 is mounted on the boom 55 in a manner such that the section 140 projects downwardly from the boom to a position wherein it may be engaged by the feed screw 149. Thus, by rotating the feed screw 149, it is possible to provide an accurate feed for the tool on the power head 84.

In order to illustrate the versatility of the machine tool forming the subject matter of this invention, applicant has selected various typical applications of the tool. It is to be understood however that numerous other variations are possible with a machine tool embodying the specific features of this invention, and reservation is made to make such changes in the structure as may come within the purview of the accompanying claims.

What I claim as my invention is:

1. In a universal tool, supporting structure including a table having a top section, a boom extending horizontally beneath the top section and projecting beyond the rear edge thereof, a power head secured to the rearwardly projecting portion of the boom, means mounting the boom on the supporting structure for vertical swinging movement relative to the table to locate said power head above the top section of the table, the rear edge of said top section having a slot for receiving the boom in the upright position thereof, and means swingable with said boom for closing the slot in the horizontal position of the boom.

2. In a universal tool, supporting structure including a horizontally extending boom, a power head carried by said boom, a mounting on said supporting structure having a portion supporting said boom for rotation about its axis, a part secured to said boom extending radially therefrom, a nut mounted on said supporting structure in registration with said part, and a feed screw threadedly engaging said nut and engageable with said part to rotate said boom about its axis.

3. The structure defined in claim 2, including a table carried by said structure having a top section above said boom.

4. In a universal machine tool, supporting structure including a fixed table having a top section, a boom mounted on said structure beneath the top section of the table, a drive spindle carried by the rear end of the boom beyond the rear edge of the top section with the axis of said spindle spaced laterally from and extending substantially parallel to the boom axis, a part attachable to the boom beyond the front edge of the top section, a second spindle supported on said part for sliding movement in the direction of the axis of the drive spindle and cooperating with the latter to support a length of work above the top section of the table, a feed screw threadably supported by said part and engageable with the second spindle for moving the latter toward and away from the drive spindle, means mounting the boom on the supporting structure for vertical swinging movement relative to the table to locate said drive spindle in an upright position above the top section of the table, said mounting means also supporting the boom for sliding movement in the direction of its axis to locate the drive spindle at different distances from said table, said mounting means further supporting the boom for rotation relative to the table enabling positioning the drive spindle below the plane of the table, and a table extension attachable to the supporting structure at the rear edge of the top section and having a slot providing clearance for a cutting tool on said drive spindle.

5. The structure defined in claim 4 comprising means supporting the table extension for tilting movement and means for clamping the table extension in different angular positions relative to the top section of the table.

6. In a universal machine tool, supporting structure including a table having a top section, a boom extending beneath the top section and mounted on the supporting structure, a driving spindle carried by the rear end of the boom beyond the rear edge of the top section with the axis of the spindle spaced laterally from and extending substantially parallel to the boom axis, means mounting the boom on the supporting structure for vertical swinging movement to locate the spindle in an upright position above the table and for sliding movement in the direction of the boom axis to vary the position of the spindle relative to the table, means mounting the spindle on said boom for sliding movement relative to the boom toward and away from the table, means for sliding said spindle, a table extension removably mounted on the supporting structure at the rear edge of the top section for tilting movement relative to the table, and means for clamping said extension in different angular positions relative to the table.

7. In a universal machine tool, supporting structure including a table having a top section, a boom extending beneath the top section and mounted on the supporting structure, a driving spindle carried by the rear end of the boom beyond the rear edge of the top section with the axis of the spindle spaced laterally from and extending substantially parallel to the boom axis, means mounting the boom on the supporting structure for vertical swinging movement to locate the spindle in an upright position above the table and for sliding movement in the direction of the boom axis to vary the position of the spindle relative to the table, means mounting the spindle on said boom for sliding movement relative to the boom toward and away from the table, means for sliding said spindle, said boom mounting means also supporting the boom for rotation about its axis to locate the spindle in different angular positions relative to the table, clamping means for holding the boom in the selected adjusted positions thereof, said boom being rotatable to locate the spindle beneath the plane of the top section of the table, and a table extension removably attachable to the supporting structure at the rear edge of the top section and having a clearance slot for receiving a rotary tool on said spindle.

8. The structure defined in claim 7 comprising a pivotal mounting for the table extension providing for tilting movement of said extension to different angular positions relative to the plane of rotation of a rotary tool on said spindle.

9. In a universal machine tool, supporting structure including a table having a top section, a boom extending horizontally beneath the top section and having the rear end projecting beyond the rear edge of the top section, a power head secured to the rear end of the boom and having a driving spindle extending substantially parallel to the boom axis to one side of the boom, a mounting on the supporting structure below the top section of the table and having a portion slidably and rotatably supporting said boom, a pivotal connection between the boom and supporting structure permitting upward swinging movement of the rear end of the boom from a horizontal position below the top section of the table to an upright position wherein said power head is spaced above the top section, a plate removably mounted on the supporting structure between the power head and the rear edge of the top section in a position to form an extension of the top section, and a tail stock assembly removably supported on the boom beyond the front edge of the top section.

10. In a universal machine tool, supporting structure including a table having a top section, a boom extending horizontally beneath the top section and having the rear end projecting beyond the rear edge of the top section, a power head secured to the rear end of the boom and having a driving spindle extending substantially parallel to the boom axis to one side of the boom, a mounting on the supporting structure below the top section of the table and having a portion slidably and rotatably supporting said boom, a pivotal connection between the boom and supporting structure permitting upward swinging movement of the rear end of the boom from a horizontal position below the top section of the table to an upright position wherein said power head is spaced above the top section, a plate extension for the top section selectively mounted on the supporting structure at the front and rear ends of the power head in the horizontal position of the boom, and means removably pivotally connecting the plate to the supporting structure permitting vertical swinging movement of the plate to different angular positions relative to the top section of the table.

11. In a universal machine tool, supporting structure including a table having a top section, a boom extending horizontally beneath the top section and having the rear end projecting beyond the rear edge of the top section, a power head secured to the rear end of the boom and having a driving spindle extending substantially parallel to the boom axis to one side of the boom, a mounting on the supporting structure below the top section of the table and having a portion slidably and rotatably supporting said boom, a pivotal connection between the boom and supporting structure permitting upward swinging movement of the rear end of the boom from a horizontal position below the top section of the table to an upright position wherein said power head is spaced above the top section, a tail stock having a centering spindle, clamping means for removably and rotatably supporting the tail stock assembly on the boom permitting rotation of the assembly from an upright position in the horizontal position of the boom to a position wherein said assembly extends downwardly from the boom, a nut mounted on the frame structure in registration with the tail stock assembly when in its depending position relative to the boom, and a feed screw selectively removably supported by the tail stock assembly and said nut for feeding the centering spindle and rotating the boom about its horizontal axis.

12. In a universal machine tool, supporting structure including a table having a plate forming a top for the table, a boom extending horizontally beneath the plate and projecting beyond the rear edge of the plate, a power head secured to the rearwardly projecting portion of the boom and projecting above the plane of the plate, means mounting the boom on the supporting structure permitting sliding movement of the boom in the direction of its axis to locate the power head different distances from the rear edge of the plate, a second plate forming an extension of the table top and removably mounted on the supporting structure between the power head and rear edge of the first mentioned plate, said mounting means also supporting the boom for rotation enabling positioning the power head below the second plate, and said second plate having a tool receiving slot therethrough.

13. The structure defined in claim 12 wherein the mounting means for the second plate comprises a pivotal connection between the second plate and supporting structure permitting swinging movement of the second plate about a generally horizontal axis to different angular positions relative to the first named plate.

14. In a universal machine tool, supporting structure including a table having a plate forming a top for the table, a boom extending horizontally beneath the plate and projecting beyond the rear edge of the plate, a power head secured to the rearwardly projecting portion of the boom and extending above the plane of the plate, a mounting supported by the supporting structure below the plate and slidably engaging the boom, means pivotally connecting the mounting to the supporting structure permitting upward swinging movement of the rear end of the boom to a position wherein the power head is positioned above the plate, releasable clamping means for holding the boom against movement relative to the mounting, said plate having a slot in the rear edge for receiving the mounting in the vertical position of the boom, and means on the mounting for closing the slot in the horizontal position of the boom.

References Cited in the file of this patent

UNITED STATES PATENTS

| | | |
|---|---|---|
| 283,341 | Greenlee | Aug. 14, 1883 |
| 356,642 | Howard | Jan. 25, 1887 |
| 699,535 | Kelley | May 6, 1902 |
| 715,864 | Reasoner | Dec. 16, 1902 |
| 1,167,091 | McGill | Jan. 4, 1916 |
| 1,792,955 | Willis | Feb. 17, 1931 |
| 1,846,641 | Hedgpeth | Feb. 23, 1932 |
| 1,864,840 | Lehner | June 28, 1932 |
| 2,013,778 | Halvorsen et al. | Sept. 10, 1935 |
| 2,071,201 | Frech | Feb. 16, 1937 |
| 2,089,362 | Haas | Aug. 10, 1937 |
| 2,089,363 | Haas | Aug. 10, 1937 |
| 2,105,009 | Roebuck | Jan. 11, 1938 |
| 2,154,745 | Hedgpeth | Apr. 18, 1939 |
| 2,157,241 | Manning | May 9, 1939 |
| 2,200,799 | Miller | May 14, 1940 |
| 2,226,029 | Taylor | Dec. 24, 1940 |
| 2,260,635 | Musselman | Oct. 28, 1941 |
| 2,313,617 | Bray | Mar. 9, 1943 |
| 2,347,374 | Stahler | Apr. 25, 1944 |
| 2,517,608 | Taylor | Aug. 8, 1950 |
| 2,619,135 | Callaway | Nov. 25, 1952 |
| 2,601,878 | Anderson | July 1, 1952 |
| 2,661,037 | McGihon | Dec. 1, 1953 |

FOREIGN PATENTS

| | | |
|---|---|---|
| 689,368 | France | May 26, 1930 |